United States Patent
Kolbe et al.

(10) Patent No.: US 10,562,121 B2
(45) Date of Patent: Feb. 18, 2020

(54) WEAR RESISTANT PARTS AND FABRICATION

(71) Applicant: Schlumberger Technology Corporation, Sugar Land, TX (US)

(72) Inventors: Stuart Alan Kolbe, Stonehouse (GB); Jonathan Luke James, Stonehouse (GB); Kjell Haugvaldstad, Sor-Trondelag (NO); Svein Olav Vikan, Sor-Trondelag (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/751,995

(22) PCT Filed: Aug. 10, 2016

(86) PCT No.: PCT/US2016/046220
§ 371 (c)(1),
(2) Date: Feb. 12, 2018

(87) PCT Pub. No.: WO2017/027530
PCT Pub. Date: Feb. 16, 2017

(65) Prior Publication Data
US 2018/0236580 A1  Aug. 23, 2018

Related U.S. Application Data

(60) Provisional application No. 62/204,397, filed on Aug. 12, 2015.

(51) Int. Cl.
*B32B 3/00* (2006.01)
*B23K 1/00* (2006.01)
(Continued)

(52) U.S. Cl.
CPC .......... *B23K 1/0008* (2013.01); *E21B 34/06* (2013.01); *B23K 2103/52* (2018.08)

(58) Field of Classification Search
CPC .......................... B32K 1/0008; E21B 17/10
See application file for complete search history.

(56) References Cited

U.S. PATENT DOCUMENTS 5,846,269 A  12/1998  Shiue et al.
2004/0020636 A1  2/2004  Kenison et al.
(Continued)

OTHER PUBLICATIONS

International Search Report and Written Opinion issued in International Patent application PCT/US2016/046220, dated Nov. 11, 2016. 13 pages.
(Continued)

*Primary Examiner* — Elizabeth E Mulvaney (57) ABSTRACT

A wear resistant part includes a first material including a structure having a surface feature. The first material is capable of maintaining its structure at a temperature from about 1000° C. to about 1500° C. (e.g., upon exposure to the temperature or upon being heated to reach the temperature). The wear resistant part also includes a second material formed into a shape extending partially around the structure of the first material while exposing the surface feature of the first material. The shape of the second material is formed by a matrix infiltration at a temperature from about 1000° C. to about 1500° C.

20 Claims, 6 Drawing Sheets

(51) Int. Cl.
*E21B 34/06* (2006.01)
*B23K 103/00* (2006.01)

(56) References Cited

U.S. PATENT DOCUMENTS

2007/0235003 A1   10/2007  Cagney et al.
2012/0103594 A1    5/2012  Hall et al.
2015/0152807 A1    6/2015  Grahle et al.
2015/0275589 A1* 10/2015  Walker ................ E21B 17/1078
                                                            175/40

OTHER PUBLICATIONS

International Preliminary Report on Patentability issued in International Patent application PCT/US2016/046220, dated Feb. 22, 2018, 10 pages.

* cited by examiner

WEAR RESISTANT PARTS AND FABRICATION

RELATED APPLICATIONS

This application claims the benefit of a related U.S. Provisional Application Ser. No. 62/204,397 filed on Aug. 12, 2015, entitled HIGH MELTING POINT INSERTS FOR BONDING OR CASTING TO INFILTRATED TUNGSTEN CARBIDE to Stuart Alan Kolbe et al., the disclosure of which is incorporated by reference herein in its entirety.

BACKGROUND

Oil wells are created by drilling a hole into the earth using a drilling rig that rotates a drill string (e.g., drill pipe) having a drill bit attached thereto. The drill bit, aided by the weight of pipes (e.g., drill collars) cuts into rock within the earth. Drilling fluid (e.g., mud) is pumped into the drill pipe and exits at the drill bit. The drilling fluid may be used to cool the bit, lift rock cuttings to the surface, at least partially prevent destabilization of the rock in the wellbore, and/or at least partially overcome the pressure of fluids inside the rock so that the fluids do not enter the wellbore.

SUMMARY

Aspects of the disclosure can relate to a wear resistant part that includes a first material including a structure having a surface feature. The first material is capable of maintaining its structure at a temperature from about 1000° C. to about 1500° C. (e.g., upon exposure to the temperature or upon being heated to reach the temperature). The wear resistant part also includes a second material formed into a shape extending partially around the structure of the first material while exposing the surface feature of the first material. The shape of the second material is formed by a matrix infiltration at a temperature from about 1000° C. to about 1500° C.

Other aspects of the disclosure can relate to a method for forming a wear resistant part from a first material and a second material. The method can include receiving a structure having at least one surface feature, where the structure is formed of a first material capable of maintaining the structure at a temperature from about 1000° C. to about 1500° C. (e.g., upon exposure to the temperature or upon being heated to reach the temperature). The method can also include forming, by a matrix infiltration at a temperature from about 1000° C. to about 1500° C., a second material into a shape that can extend partially around the structure of the first material while exposing the at least one surface feature of the first material. The method can also include connecting the second material to the first material.

Also, aspects of the disclosure can relate to a wear resistant part that includes a first material including a structure having at least one surface feature. The first material is capable of maintaining its structure at a temperature from about 1000° C. to about 1500° C. (e.g., upon exposure to the temperature or upon being heated to reach the temperature). The wear resistant part also includes a second material connected to the first material. The second material is formed into a shape extending partially around the structure of the first material while exposing the at least one surface feature of the first material. The shape of the second material is formable by a matrix infiltration at a temperature from about 1000° C. to about 1500° C.

This summary is provided to introduce a selection of concepts that are further described below in the detailed description. This summary is not intended to identify key or essential features of the claimed subject matter, nor is it intended to be used as an aid in limiting the scope of the claimed subject matter.

FIGURES

Embodiments of wear resistant parts and fabrication thereof are described with reference to the following figures. The same numbers are used throughout the figures to reference like features and components.

DETAILED DESCRIPTION

The material or materials from which a tool is fabricated can influence the durability and associated structural characteristics of the particular tool and can influence the operating environment in which the tool can be employed. For systems used in highly abrasive environments, wear of system components can lead to downtime of the systems, which can influence throughput of applications in the highly abrasive environments. Such applications can include, but are not limited to, drilling applications, boring applications, and mining applications. Further, the operation of a first tool component can influence the structural integrity of a second tool component. For example, operation of a rotary valve can introduce a rotor spinning relative to an operating surface of a stator. Such operation can introduce wear to mated regions of the rotor and stator, where replacement of either or both of the rotor and the stator can affect the operating life of the rotary valve.

Aspects of the present disclosure relate to wear resistant parts, where in some embodiments, the wear resistant parts can form at least a portion of a tool or system that can be used in highly abrasive environments. The wear resistant parts can form a surface feature (e.g., an operating surface, such as a running surface, bushing surface, or so forth) that is exposed following connection between a first material and a second material, the materials that provide shape and structure to the wear resistant part. In some embodiments, the wear resistant parts can be included in a valve (e.g., a rotary valve), a piston, a flow channel, a bearing, a filter, a stabilizer, a flow diverter, or other tools or systems. As described herein, drilling applications are provided by way of example and are not meant to limit the present disclosure. In other embodiments, systems, techniques, and apparatus as described herein can be used with other down hole operations. Further, such systems, techniques, and apparatus can be used in other applications not necessarily related to down hole operations.

Figure 1:
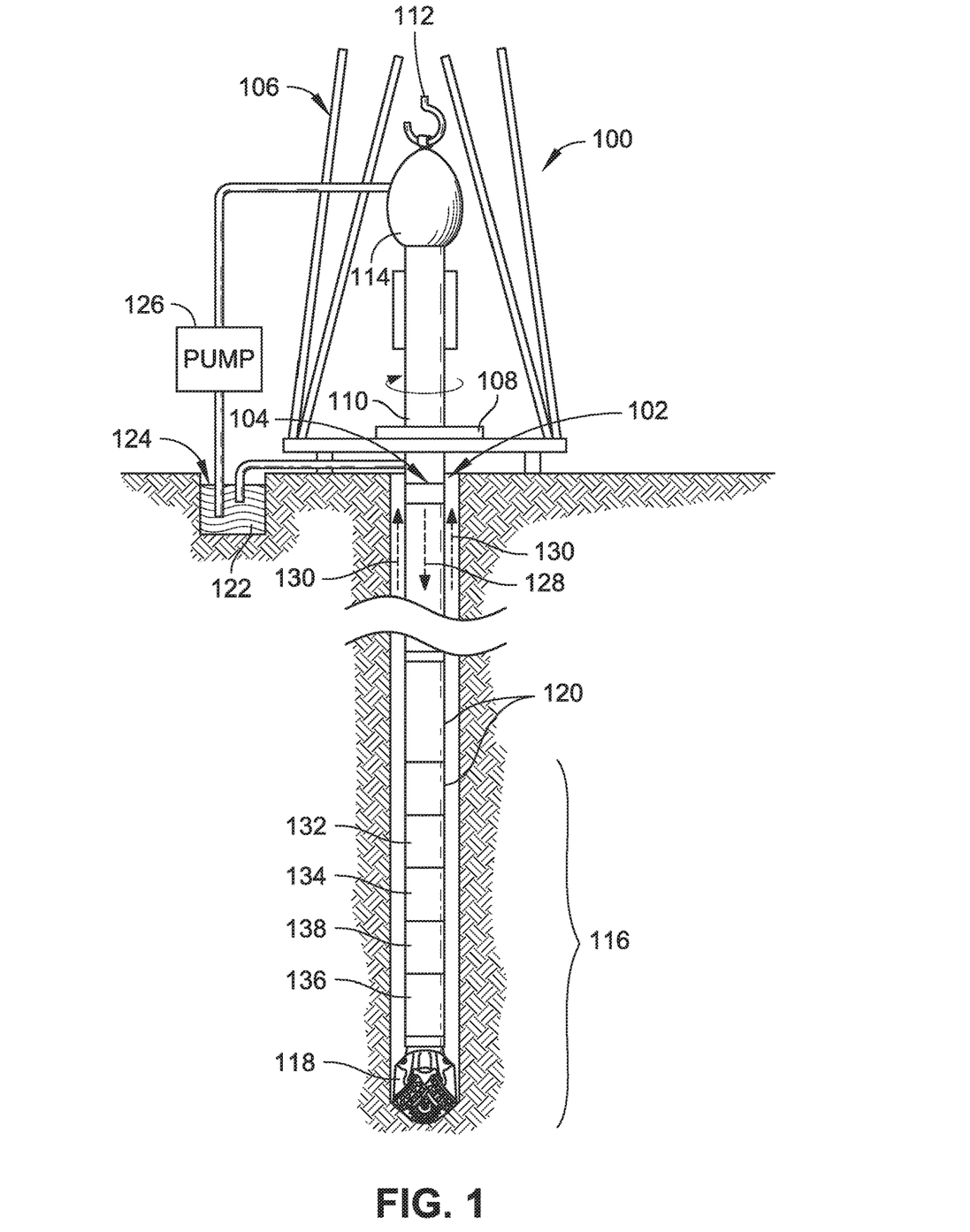
FIG. 1 illustrates an example system in which embodiments of wear resistant parts and fabrication can be implemented.

FIG. 1 depicts a wellsite system 100 in accordance with one or more embodiments of the present disclosure. The wellsite can be onshore or offshore. A borehole 102 is formed in subsurface formations by directional drilling. A drill string 104 extends from a drill rig 106 and is suspended within the borehole 102. In some embodiments, the wellsite system 100 implements directional drilling using a rotary steerable system (RSS). For instance, the drill string 104 is rotated from the surface, and down hole devices move the end of the drill string 104 in a desired direction. The drill rig 106 includes a platform and derrick assembly positioned over the borehole 102. In some embodiments, the drill rig 106 includes a rotary table 108, kelly 110, hook 112, rotary swivel 114, and so forth. For example, the drill string 104 is rotated by the rotary table 108, which engages the kelly 110 at the upper end of the drill string 104. The drill string 104 is suspended from the hook 112 using the rotary swivel 114, which permits rotation of the drill string 104 relative to the hook 112. However, this configuration is provided by way of example and is not meant to limit the present disclosure. For instance, in other embodiments a top drive system is used.

A bottom hole assembly (BHA) 116 is suspended at the end of the drill string 104. The bottom hole assembly 116 includes a drill bit 118 at its lower end. In embodiments of the disclosure, the drill string 104 includes a number of drill pipes 120 that extend the bottom hole assembly 116 and the drill bit 118 into subterranean formations. Drilling fluid (e.g., mud) 122 is stored in a tank and/or a pit 124 formed at the wellsite. The drilling fluid 122 can be water-based, oil-based, and so on. A pump 126 displaces the drilling fluid 122 to an interior passage of the drill string 104 via, for example, a port in the rotary swivel 114, causing the drilling fluid 122 to flow downwardly through the drill string 104 as indicated by directional arrow 128. The drilling fluid 122 exits the drill string 104 via ports (e.g., courses, nozzles) in the drill bit 118, and then circulates upwardly through the annulus region between the outside of the drill string 104 and the wall of the borehole 102, as indicated by directional arrows 130. In this manner, the drilling fluid 122 cools and lubricates the drill bit 118 and carries drill cuttings generated by the drill bit 118 up to the surface (e.g., as the drilling fluid 122 is returned to the pit 124 for recirculation). Further, destabilization of the rock in the wellbore can be at least partially prevented, the pressure of fluids inside the rock can be at least partially overcome so that the fluids do not enter the wellbore, and so forth.

In embodiments of the disclosure, the drill bit 118 comprises one or more crushing and/or cutting implements, such as conical cutters and/or bit cones having spiked teeth (e.g., in the manner of a roller-cone bit). In this configuration, as the drill string 104 is rotated, the bit cones roll along the bottom of the borehole 102 in a circular motion. As they roll, new teeth come in contact with the bottom of the borehole 102, crushing the rock immediately below and around the bit tooth. As the cone continues to roll, the tooth then lifts off the bottom of the hole and a high-velocity drilling fluid jet strikes the crushed rock chips to remove them from the bottom of the borehole 102 and up the annulus. As this occurs, another tooth makes contact with the bottom of the borehole 102 and creates new rock chips. In this manner, the process of chipping the rock and removing the small rock chips with the fluid jets is continuous. The teeth intermesh on the cones, which helps clean the cones and enables larger teeth to be used. A drill bit 118 comprising a conical cutter can be implemented as a steel milled-tooth bit, a carbide insert bit, and so forth. However, roller-cone bits are provided by way of example and are not meant to limit the present disclosure. In other embodiments, a drill bit 118 is arranged differently. For example, the body of the drill bit 118 comprises one or more polycrystalline diamond compact (PDC) cutters that shear rock with a continuous scraping motion.

In some embodiments, the bottom hole assembly 116 includes a logging-while-drilling (LWD) module 132, a measuring-while-drilling (MWD) module 134, a rotary steerable system 136, a motor, and so forth (e.g., in addition to the drill bit 118). The logging-while-drilling module 132 can be housed in a drill collar and can contain one or a number of logging tools. It should also be noted that more than one LWD module and/or MWD module can be employed (e.g. as represented by another logging-while-drilling module 138). In embodiments of the disclosure, the logging—while drilling modules 132 and/or 138 include capabilities for measuring, processing, and storing information, as well as for communicating with surface equipment, and so forth.

The measuring-while-drilling module 134 can also be housed in a drill collar, and can contain one or more devices for measuring characteristics of the drill string 104 and drill bit 118. The measuring-while-drilling module 134 can also include components for generating electrical power for the down hole equipment. This can include a mud turbine generator powered by the flow of the drilling fluid 122. However, this configuration is provided by way of example and is not meant to limit the present disclosure. In other embodiments, other power and/or battery systems can be employed. The measuring-while-drilling module 134 can include one or more of the following measuring devices: a direction measuring device, an inclination measuring device, and so on. Further, a logging-while-drilling module 132 and/or 138 can include one or more measuring devices, such as a weight-on-bit measuring device, a torque measuring device, a vibration measuring device, a shock measuring device, a stick slip measuring device, and so forth.

In some embodiments, the wellsite system 100 is used with controlled steering or directional drilling. For example, the rotary steerable system 136 is used for directional drilling. As used herein, the term "directional drilling" describes intentional deviation of the wellbore from the path it would naturally take. Thus, directional drilling refers to steering the drill string 104 so that it travels in a desired direction. In some embodiments, directional drilling is used for offshore drilling (e.g., where multiple wells are drilled from a single platform). In other embodiments, directional drilling enables horizontal drilling through a reservoir, which enables a longer length of the wellbore to traverse the reservoir, increasing the production rate from the well. Further, directional drilling may be used in vertical drilling operations. For example, the drill bit 118 may veer off of a planned drilling trajectory because of the unpredictable nature of the formations being penetrated or the varying forces that the drill bit 118 experiences. When such deviation occurs, the wellsite system 100 may be used to guide the drill bit 118 back on course.

The drill string 104 can include one or more extendable displacement mechanisms, such as a piston mechanism that can be actuated by an actuator to displace a pad toward, for instance, a borehole wall to cause the bottom hole assembly 116 to move in a desired direction of deviation. In embodiments of the disclosure, a displacement mechanism can be actuated by the drilling fluid 122 routed through the drill string 104. For example, the drilling fluid 122 is used to move a piston, which changes the orientation of the drill bit 118 (e.g., changing the drilling axis orientation with respect to a longitudinal axis of the bottom hole assembly 116). The displacement mechanism may be employed to control a directional bias and/or an axial orientation of the bottom hole assembly 116. Displacement mechanisms may be arranged, for example, to point the drill bit 118 and/or to push the drill bit 118. In some embodiments, a displacement mechanism is deployed by a drilling system using a rotary steerable system 136 that rotates with a number of displacement mechanisms. It should be noted that the rotary steerable system 136 can be used in conjunction with stabilizers, such as non-rotating stabilizers, and so on.

In some embodiments, a displacement mechanism can be positioned proximate to the drill bit 118. However, in other embodiments, a displacement mechanism can be positioned at various locations along a drill string, a bottom hole assembly, and so forth. For example, in some embodiments, a displacement mechanism is positioned in a rotary steerable system 136, while in other embodiments, a displacement mechanism can be positioned at or near the end of the bottom hole assembly 116 (e.g., proximate to the drill bit 118). In some embodiments, the drill string 104 can include one or more filters that filter the drilling fluid 122 (e.g., upstream of the displacement mechanism with respect to the flow of the drilling fluid 122).

Referring now to FIGS. 2 through 5, example systems and apparatus are described that can provide wear resistant functionality to a tool or equipment, such as to portions of the wellsite system 100 described with reference to FIG. 1. For instance, the example systems and apparatus can provide a wear resistant part that can be included in a valve (e.g., a rotary valve used to select flow paths for operational fluids of the drill string 104), a piston (e.g., a piston used to actuate the extendable displacement mechanism of the drill string 104, a piston used to change the orientation of the drill bit 118, or so forth), a flow channel (e.g., a flow channel used to convey drilling fluid 122), a bearing (e.g., a bearing used in the rotary swivel 114, a bearing used in a rotary component of the drill string 104, such as the rotary steerable system 136, or so forth), a filter (e.g., a filter for the drilling fluid 122, such as upstream of the displacement mechanism with respect to the flow of the drilling fluid 122), a stabilizer (e.g., a stabilizer used in conjunction with the rotary steerable system 136), a flow diverter, or other tools or system. A wear resistant part 200 includes a first material 202 having a structure 204, where the first material 202 can maintain the structure 204 at high temperatures, such as high infiltration temperatures (e.g., stable at temperatures at and exceeding about 800° C., stable from about 1000° C. to about 1500° C., stable from about 1100° C. to about 1300° C., or so forth). In embodiments, the first material 202 can include, but is not limited to, a ceramic material, a sintered tungsten carbide material, a powder-based material (e.g., with a binder, without a binder), or combinations thereof. The ceramic material can include, but is not limited to, alumina (e.g., $Al_2O_3$ having a purity of about 95% or higher), high purity alumina ($Al_2O_3$ having a purity of above about 99%), or the like. The powder-based material can include, but is not limited to, a tungsten carbide powder, a molybdenum alloy powder, a copper powder, or the like. The binder can include, but is not limited to, a cobalt-based binder, a copper alloy binder, combinations thereof, or the like. For instance, ceramic materials, sintered tungsten carbide materials, and other powder-based materials can maintain structural integrity during an infiltration process (e.g., involving infiltrated tungsten carbide) at temperatures ranging from 1000° C. to 1500° C., whereas in some instances, diamond materials (e.g., portions of polycrystalline diamond compact materials) could convert to graphite at high infiltration temperatures (e.g., temperatures at and above 800° C.).

The first material 202 also defines at least one surface feature 206. FIGS. 2 through 5 each show the surface feature 206 as a flow channel (e.g., a linear flow channel shown in FIGS. 2 and 3, a non-linear flow channel shown in FIGS. 4 and 5). However, a flow channel is provided by way of example of the surface feature 206, and is not meant to limit the present disclosure. For example, in embodiments, the surface feature 206 is a high tolerance feature, such as an operating surface of the wear resistant part 200, including, but not limited to, a running surface, a bushing surface, a linear flow channel, a nonlinear flow channel, or so forth. Moreover, the surface feature 206 can include a plurality of flow channels, operating surfaces, or combinations thereof to provide highly toleranced and scalable components that can withstand high infiltration temperatures. In embodiments, a "high tolerance feature" can be understood to refer to a feature spacing between mating parts on the order of microns (e.g., ranging from between about 0 microns to about 100 microns). For example, in one instance of a high tolerance feature, when a cylindrical rotating part has a diameter of at least approximately 30 mm, the spacing between the outer circumferential surface of the rotating part and an inner circumferential surface of bearing that receives the rotating part can be a distance of at least approximately 5 microns.

The wear resistant part 200 also includes a second material 208 formed into a shape 210 extending partially around the structure 204 of the first material 202 while exposing the surface feature 206 of the first material 202. For example, the flow channels shown in FIGS. 2 through 5 remain exposed while the second material 208 is formed into the shape 210 extending partially around the structure 204 of the first material 202. An exposed portion of the surface feature 206 can then interact with another structure, such as a part 214, to provide functionality as a tool component or system component, such as through providing an operating surface with which to interface. For example, the part 214 can facilitate selection or operation of the flow channels formed by the surface feature 206 of the first material 202 by rotation of the part 214 relative to the wear resistant part 200. The first material can be machined, molded, formed, or otherwise shaped, where a subsequent infiltration technique (e.g., an infiltration molding process) can connect (e.g., bond) the first material 202 with the second material 208. For example, the first material 202 can be machined, molded, formed, or otherwise shaped into the structure 204 (e.g., an insert portion) that includes the surface feature 206, where the structure 204 is connected to the second material 208 that is shaped into the shape 210 by infiltration of the second material 208 and where the second material 208 extends partially around the structure 204 of the first material 202 to expose the surface feature 206 of the first material 202. In embodiments, the second material 208 can be the same as the first material 202, can differ from the first material 202, or combinations thereof. For example, the second material can include an infiltrated tungsten carbide material.

The shape 210 of the second material 208 is formable by a matrix infiltration at a high infiltration temperature at which the structure of first material retains structural integrity. The high infiltration temperature can be at a temperature above about 800° C. For example, in some embodiments, the high infiltration temperature is a temperature from about 1,000° C., 1,010° C., 1,020° C., 1,030° C., 1,040° C., 1,050° C., 1,060° C., 1,070° C., 1,080° C., 1,090° C., 1,100° C., 1,110° C., 1,120° C., 1,130° C., 1,140° C., 1,150° C., 1,160° C., 1,170° C., 1,180° C., 1,190° C., 1,200° C., 1,210° C., 1,220° C., 1,230° C., 1,240° C., 1,250° C., 1,260° C., 1,270° C., 1,280° C., 1,290° C., 1,300° C., 1,310° C., 1,320° C., 1,330° C., 1,340° C., 1,350° C., 1,360° C., 1,370° C., 1,380° C., 1,390° C., 1,400° C., 1,410° C., 1,420° C., 1,430° C., 1,440° C., 1,450° C., 1,460° C., 1,470° C., 1,480° C., or 1,490° C. to a temperature of about 1,010° C., 1,020° C., 1,030° C., 1,040° C., 1,050° C., 1,060° C., 1,070° C., 1,080° C., 1,090° C., 1,100° C., 1,110° C., 1,120° C., 1,130° C., 1,140° C., 1,150° C., 1,160° C., 1,170° C., 1,180° C., 1,190° C., 1,200° C., 1,210° C., 1,220° C., 1,230° C., 1,240° C., 1,250° C., 1,260° C., 1,270° C., 1,280° C., 1,290° C., 1,300° C., 1,310° C., 1,320° C., 1,330° C., 1,340° C., 1,350° C., 1,360° C., 1,370° C., 1,380° C., 1,390° C., 1,400° C., 1,410° C., 1,420° C., 1,430° C., 1,440° C., 1,450° C., 1,460° C., 1,470° C., 1,480° C., 1,490° C., or 1,500° C. The matrix infiltration process can include a standard atmosphere for infiltration of the second material. In embodiments, the matrix infiltration process can include a controlled atmosphere, such as an oxygen purge during infiltration of the second material, use of a flux during infiltration, or so forth. An oxygen purge can remove oxygen from the infiltration environment as a potential reactant with materials involved in the matrix infiltration process (e.g., surfaces of the first material 202, metalized surfaces (described further herein), or so forth).

In embodiments, a surface 212 of the first material 202 in contact with the second material 208 is metalized. The surface 212 can be metalized to facilitate connection between the first material 202 and the second material 208 during a process used to bond the first material 202 with the second material. The process can include, for example, a matrix infiltration process (e.g., matrix infiltration process used to form the shape 210 of the second material), a brazing process, or combinations thereof. For example, when the first material 202 is machined, molded, formed, or otherwise shaped to provide the structure 204 and surface feature 206, the surface 212 can be metalized for bonding the first material 202 to the second material 208 during matrix infiltration, during a brazing process, or combinations thereof. In some embodiments, the surface 212 is metalized to provide a sealed surface between the first material 202 and the second material 208 following a process to join the first material 202 and the second material 208 (e.g., infiltration process, brazing process, or so forth). For example, a metalized surface on a ceramic component can provide a sealed surface between the ceramic component and an infiltrated tungsten carbide material following a matrix infiltration of the tungsten carbide material, following a brazing process, or so forth. In embodiments, the metal applied to the surface 212 can be the same as, or metallurgically similar to, an infiltration binding material used to infiltrate the second material 208, which can facilitate a complete bond between the first material 202 and the second material 208. For example, a metallurgically similar metal can include, but is not limited to, a metal having a similar metal composition, lattice structure, crystal structure, or the like. A brazing process used to bond the first material 202 and the second material 208 via the surface 212 that is metalized can provide a removable, sealed running surface.

Figure 2:
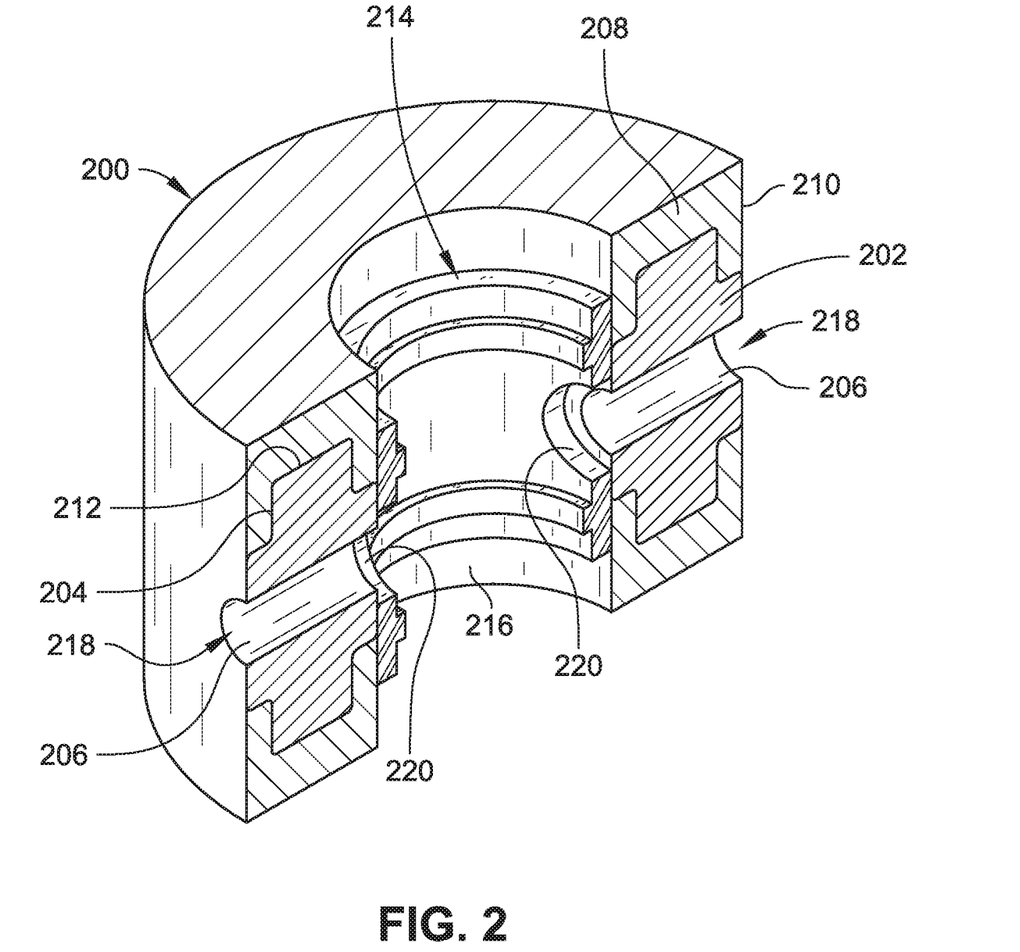
FIG. 2 is a cross-sectional isometric view illustrating various components of an example device that can implement embodiments of wear resistant parts and fabrication.
Figure 3:
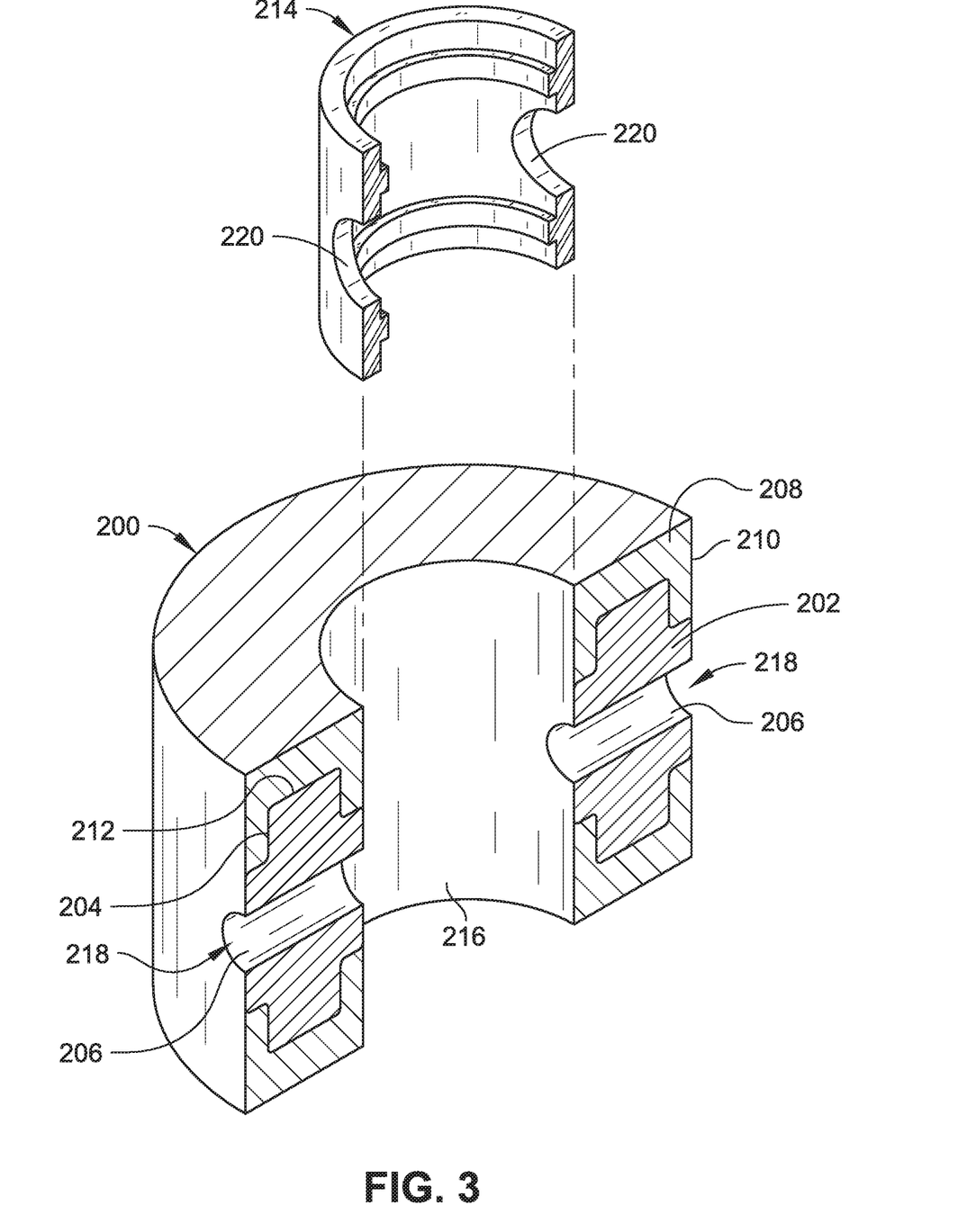
FIG. 3 is a cross-sectional exploded isometric view of the components illustrated in FIG. 2.

Referring to FIGS. 2 and 3, the wear resistant part 200 is shown with the part 214 in an internal portion 216 of the wear resistant part 200 and exploded therefrom, respectively. The structure 204 of the wear resistant part 200 provides the surface feature 206 in the form of a linear flow channel extending through the structure 204, providing access to the interior portion 216. For example, the structure 204 can be formed from a ceramic material, a sintered tungsten carbide material, or other powder-based material (e.g., with a binder, without a binder), or combinations thereof and machined, molded, formed, or otherwise shaped to provide the structure 204 and surface feature 206. The second material 208 is formed into the shape 210 (e.g., with an approximately cylindrical exterior) extending partially around the structure 204 while exposing the surface feature 206, such as to permit access to the surface feature 206 from the interior portion 216, from an exterior access region 218, other access regions, or combinations thereof. For example, the structure 204 can be placed into a mold and the second material 208 is infiltrated to form the shape 210 around the structure 204 (while maintaining exposure of the surface feature 206) to bind the first material 202 and the second material 208. When the part 214 is positioned in the interior portion 216, the part 214 can facilitate selection or operation of the flow channels formed by the surface feature 206 of the first material 202 by rotation of the part 214 relative to the wear resistant part 200 within the interior portion 216, such as by aligning one or more ports 220 formed in the part 214 with one or more flow channels formed by the surface feature 206 in the structure 204.

Figure 4:
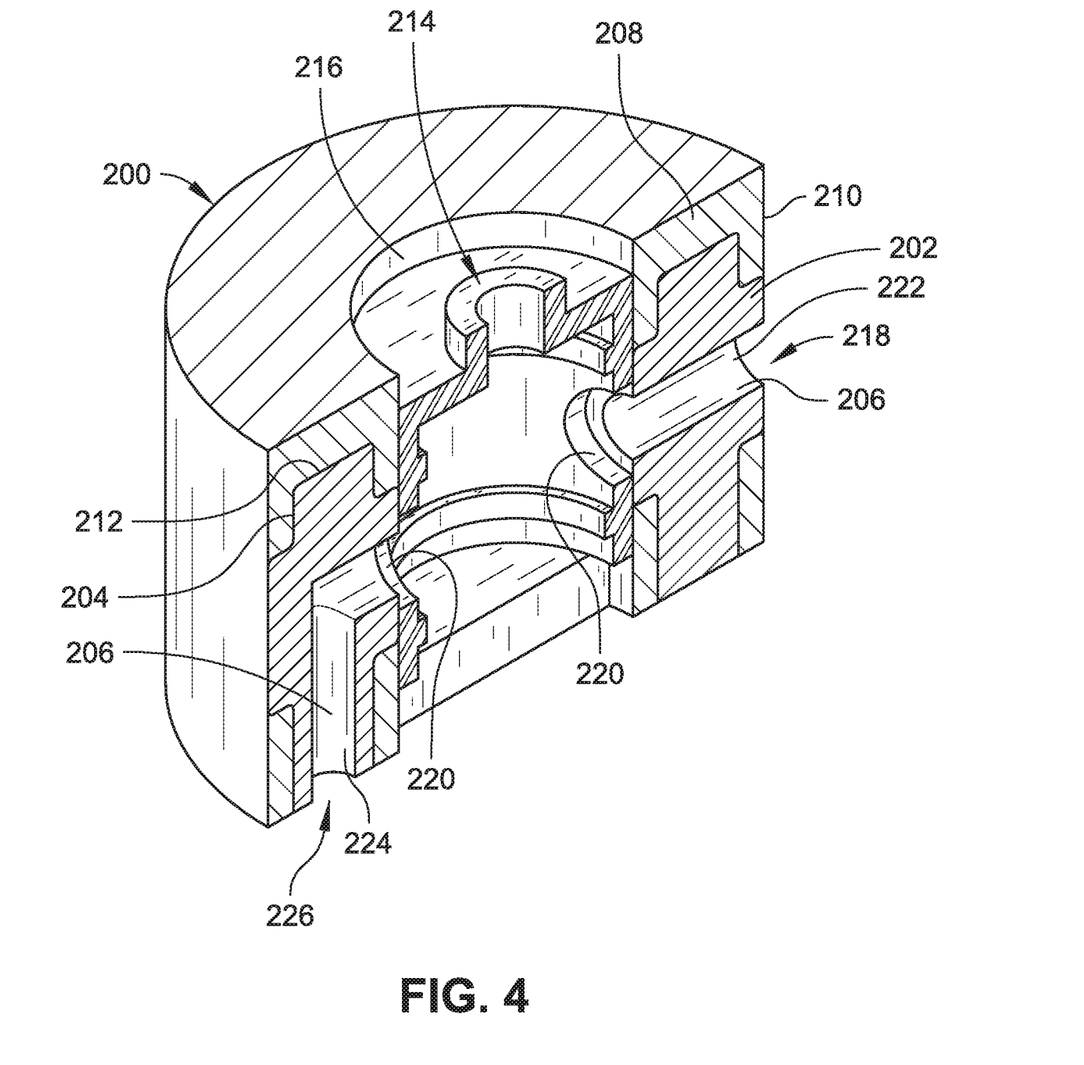
FIG. 4 is a cross-sectional isometric view illustrating various components of an example device that can implement embodiments of wear resistant parts and fabrication.
Figure 5:
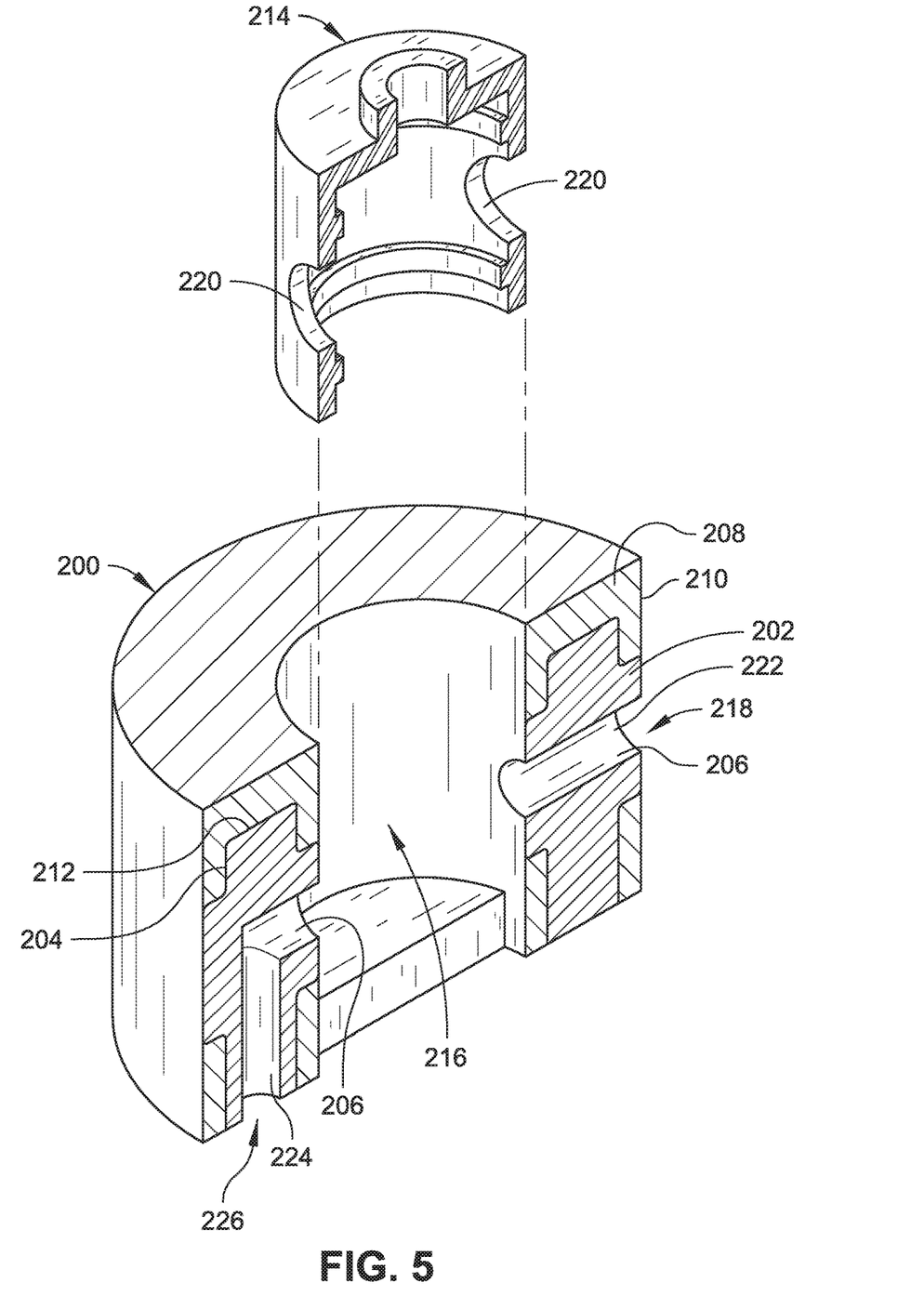
FIG. 5 is a cross-sectional exploded isometric view of the components illustrated in FIG. 4.

Referring to FIGS. 4 and 5, the wear resistant part 200 is shown with the part 214 in the internal portion 216 of the wear resistant part 200 and exploded therefrom, respectively. The structure 204 of the wear resistant part 200 provides the surface feature 206 in the form of a linear flow channel 222 extending through the structure 204, providing access to the interior portion 216, and in the form of a nonlinear flow channel 224 providing access to the interior portion 216 from a bottom access region 226. For example, the structure 204 can be formed from a ceramic material, a sintered tungsten carbide material, or other powder-based material (e.g., with a binder, without a binder), or combinations thereof and machined, molded, formed, or otherwise shaped to provide the structure 204 and surface feature 206. The second material 208 is formed into the shape 210 (e.g., with an approximately cylindrical exterior) extending partially around the structure 204 while exposing the surface feature 206, such as to permit access to the surface feature 206 from the interior portion 216, from the exterior access region 218, from the bottom access region 226, from other access regions, or combinations thereof. For example, the structure 204 can be placed into a mold and the second material 208 is infiltrated to form the shape 210 around the structure 204 (while maintaining exposure of the surface feature 206) to bind the first material 202 and the second material 208. When the part 214 is positioned in the interior portion 216, the part 214 can facilitate selection or operation of the linear flow channel 222 and the nonlinear flow channel 224 formed by the surface feature 206 of the first material 202 by rotation of the part 214 relative to the wear resistant part 200 within the interior portion 216, such as by aligning one or more ports 220 formed in the part 214 with the linear flow channel 222, the nonlinear flow channel 224, or combinations thereof.

Figure 6:
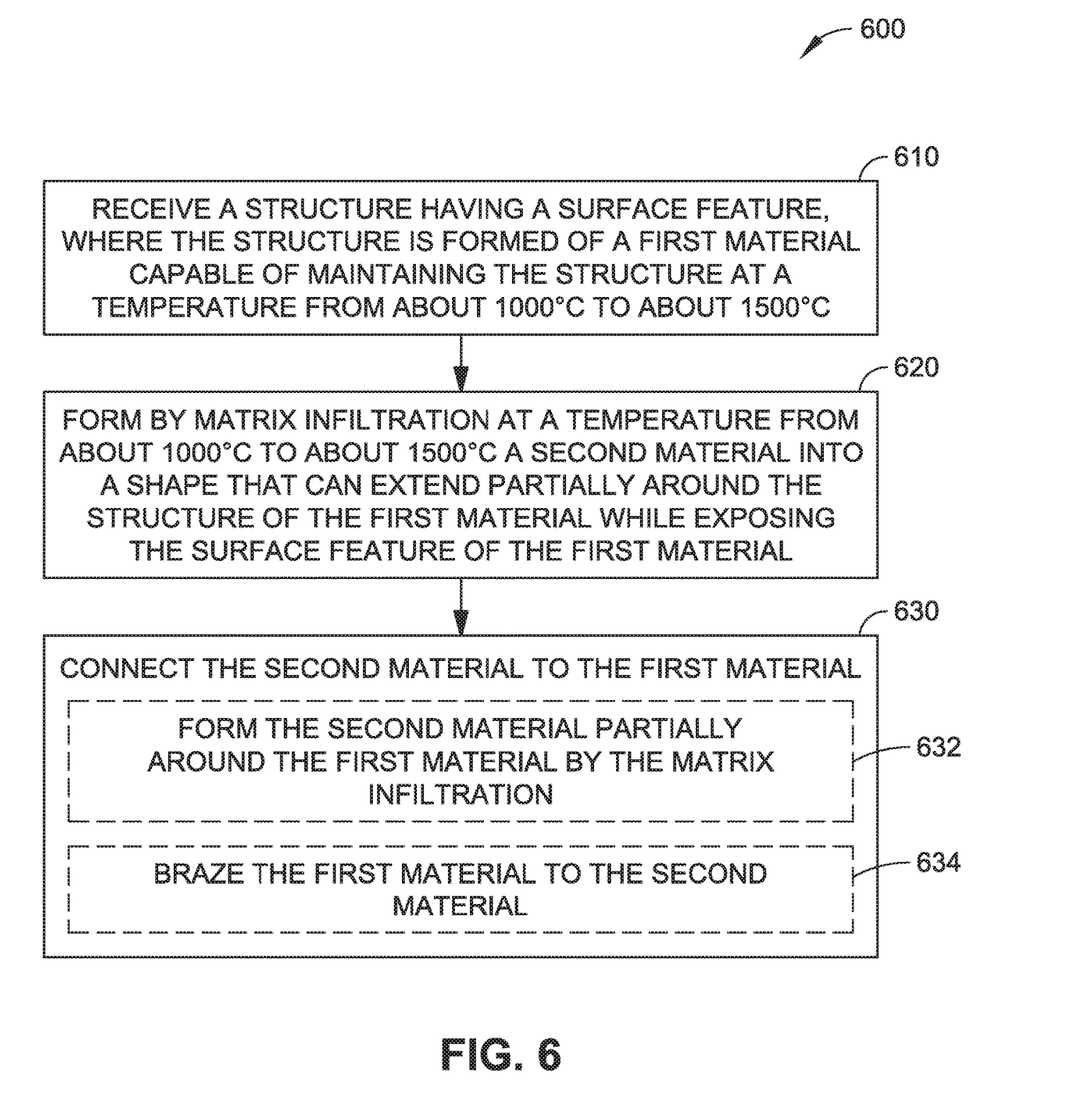
FIG. 6 illustrates example method(s) for forming a wear resistant part from a first material and a second material in accordance with one or more embodiments.

Referring now to FIG. 6, a procedure 600 is described in an example embodiment in which a wear resistant part is formed from a first material and a second material. At block 610, a structure, such as the structure 104, having one or more surface features, such as the surface feature 106, is received, where the structure is formed of a first material, such as a ceramic material, a sintered tungsten carbide material, or powder-based material, or combinations thereof, capable of maintaining the structure at a temperature from about 1000° C. to about 1500° C. At block 620, matrix infiltration at a temperature from about 1000° C. to about 1500° C., is used to form a second material, such as an infiltrated tungsten carbide material, into a shape that can extend partially around the structure of the first material while exposing the surface feature of the first material. At block 630, the second material is connected to the first material. In some embodiments, at block 632, the second material can be formed partially around the first material by the matrix infiltration. As described herein, one or more surfaces of the first material may be metalized for bonding with the second material during the matrix infiltration. In some embodiments, at block 634, the first material can be brazed to the second material (e.g., when one or more surfaces of the first material are metalized).

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Additionally, it should be understood that references to "one embodiment" or "an embodiment" of the present disclosure are not intended to be interpreted as excluding the existence of additional embodiments that also incorporate the recited features. For example, features shown in individual embodiments referred to above may be used together in combinations other than those which have been shown and described specifically. Accordingly, any such modification is intended to be included within the scope of this disclosure. In the claims, means-plus-function clauses are intended to cover the structures described herein as performing the recited function and not just structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke means-plus-function for any limitations of any of the claims herein, except for those in which the claim expressly uses the words 'means for' together with an associated function.

What is claimed is:

1. A wear resistant part comprising:
   an insert portion, including:
      a first material, wherein the first material maintains an integrity of the insert portion at a temperature from about 1000° C. to about 1500° C.; and
      at least one operating surface configured to interact with a part; and
   a matrix including a second material, the insert portion being positioned in the matrix such that the insert portion is internal to the matrix, the at least one operating surface being exposed from the matrix.

2. The wear resistant part as recited in claim 1, wherein the first material comprises a ceramic material.

3. The wear resistant part as recited in claim 1, wherein the second material comprises an infiltrated tungsten carbide material.

4. The wear resistant part as recited in claim 1, wherein a surface of the first material in contact with the second material is metalized.

5. The wear resistant part as recited in claim 4, wherein the metalized surface of the first material is bonded with the second material.

6. A method comprising:
   receiving an insert having at least one operating surface, the insert formed of a first material;
   forming a matrix around the insert by a matrix infiltration at a temperature from about 1000° C. to about 1500° C., the matrix including a second material, the matrix being formed around the insert of the first material such that the at at least one operating surface is exposed from the matrix, wherein forming the matrix maintains an integrity of a structure of the insert during infiltration; and
   connecting the second material to the first material.

7. The method as recited in claim 6, wherein the first material comprises a ceramic material.

8. The method as recited in claim 6, wherein the second material comprises an infiltrated tungsten carbide material.

9. The method as recited in claim 6, further comprising metallizing a surface of the insert to form a metallized surface.

10. The method as recited in claim 9, wherein connecting the second material to the first material comprises brazing the first material to the second material at the metallized surface.

11. The method as recited in claim 9, wherein forming the matrix around the insert includes bonding the metallized surface with the second material during the matrix infiltration.

12. A wear resistant part comprising:
    an insert portion, including:
       a first material, wherein the first material maintains an integrity of the insert portion at a temperature from about 1000° C. to about 1500° C.;
       at least one operating surface configured to interact with a part; and
    a matrix including a second material, the matrix being connected to the first material, the matrix encompassing the insert portion, the at least one operating surface being exposed in the matrix such that the at least one operating surface can interact with the part.

13. The wear resistant part as recited in claim 12, wherein the first material comprises a ceramic material.

14. The wear resistant part as recited in claim 12, wherein the matrix is formed partially around the insert portion by a matrix infiltration.

15. The wear resistant part as recited in claim 12, wherein a surface of the first material in contact with the second material is metalized.

16. The wear resistant part as recited in claim 15, wherein the first material is brazed to the second material at the surface.

17. The wear resistant part as recited in claim 15, wherein the second material is formed partially around the first material by a matrix infiltration, and the metalized surface of the first material is for bonding with the second material during the matrix infiltration.

18. The wear resistant part as recited in claim 12, wherein the operating surface comprises a high tolerance operating surface.

19. The wear resistant part of claim 1, wherein the insert is a stator for a valve.

20. The wear resistant part of claim 1, wherein the insert portion is mechanically interlocked within the matrix.

* * * * *